(12) United States Patent
Szuecs et al.

(10) Patent No.: US 9,112,738 B2
(45) Date of Patent: Aug. 18, 2015

(54) CONTROL DEVICE HAVING A DIGITAL INTERFACE

(75) Inventors: Franz Szuecs, Waiblingen (DE); Ingo Priemer, Stuttgart (DE); Stefan Doehren, Remshalden-Grunbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/111,126

(22) PCT Filed: Mar. 28, 2012

(86) PCT No.: PCT/EP2012/055521
§ 371 (c)(1),
(2), (4) Date: Jun. 23, 2014

(87) PCT Pub. No.: WO2012/143217
PCT Pub. Date: Oct. 26, 2012

(65) Prior Publication Data
US 2014/0301432 A1    Oct. 9, 2014

(30) Foreign Application Priority Data

Apr. 21, 2011 (DE) .......................... 10 2011 007 849

(51) Int. Cl.
*H04L 25/02* (2006.01)
*B60R 21/00* (2006.01)

(52) U.S. Cl.
CPC ............ *H04L 25/0264* (2013.01); *B60R 21/00* (2013.01)

(58) Field of Classification Search
CPC ................... H04L 25/0264; H04L 12/40123; H04L 2012/40208
USPC ......... 375/219, 220, 222, 224, 295, 316, 333, 375/354, 361, 365
See application file for complete search history.

(56) References Cited

U.S. PATENT DOCUMENTS

2012/0158335 A1* 6/2012 Donovan et al. ................ 702/79
2012/0226965 A1* 9/2012 Hammerschmidt et al. .. 714/807

FOREIGN PATENT DOCUMENTS

DE        10 2008 000810        10/2009

OTHER PUBLICATIONS

International Search Report for PCT/EP2012/055521, dated Jul. 22, 2012.
"PSI5 Peripheral Sensor Interface Specification V1.3", Jul. 29, 2008, pp. 1-46, URL: http://www.psi5.org/en/pool/pdf/psi5_s retrieved on May 23, 2012.

* cited by examiner

*Primary Examiner* — Leon Flores
(74) *Attorney, Agent, or Firm* — Kenyon & Kenyon LLP

(57) ABSTRACT

A control device and a transceiver unit are presented. The control device encompasses at least one microcontroller and a digital interface, the digital interface encompassing a transceiver unit and at least one interface controller, the control device being designed selectably for a first mode in which the at least one interface controller communicates via an interface with the microcontroller, or for a second mode in which the at least one interface controller is integrated into the microcontroller.

9 Claims, 2 Drawing Sheets

CONTROL DEVICE HAVING A DIGITAL INTERFACE

CROSS REFERENCE TO RELATED APPLICATIONS

The present application is the national stage entry of International Patent Application No. PCT/EP2012/055521, filed on Mar. 28, 2012, which claims priority to Application No. DE 10 2011 007 849.5, filed in the Federal Republic of Germany on Apr. 21, 2011.

FIELD OF INVENTION

The present invention relates to a control device having a digital interface, in particular for a motor vehicle, and to a transceiver unit in a control device. A PSI5 interface is particularly appropriate as a digital interface in this context.

BACKGROUND INFORMATION

Control is applied to components in motor vehicles such as, for example, actuators or injectors on the engine using control devices. It is necessary for this purpose for the control device to receive and transmit information or data. It is known to exchange data between sensors/actuators and an associated control device by way of digital interfaces. For reliable communication in motor vehicles, PSI5 interfaces, for example, are used as digital interfaces.

PSI5 (Peripheral Sensor Interface 5) refers to a digital interface for sensors that is based on a two-wire lead and is used in automotive electronics to connect peripheral sensors to electronic control devices. Point-to-point and bus configurations are supported, with asynchronous and synchronous communication.

PSI5 operates on the principle of current interface modulation of a transmitting current for data transfer on the power supply lead. A high level of interference resistance is achieved thanks to the relatively high signal current and the use of Manchester bit coding, with the result that it is sufficient to use an economical two-wire lead for wiring.

It is possible to awaken and deactivate sensors in targeted fashion using upstream data, in which context the power consumption of the PSI5 bus system can be reduced.

Sensors having a PSI5 interface, and correspondingly also receivers and transceivers for receiving sensor data, have been used for several years in the automotive sector. Bidirectional communication is also possible via the synchronization pulses, the data occurring from the control device to the sensor via the presence or absence of synchronization pulses.

All receivers and transceivers possess a Manchester decoder and an SPI interface for data transfer to the microcontroller. In order to generate synchronization pulses, receivers and transceivers that are on the market require a higher voltage (Vsync) than the sensor supply voltage for the sensor quiescent current (VAS). There is also no time stamp, and thus no indication as to how old the received data are.

It is noteworthy that engine control devices used at present do not offer an overall solution, or an economical overall solution, for the acquisition of Manchester-coded data or for bidirectional communication with PSI5 sensors. There is therefore also no possibility of detecting engine tuning.

SUMMARY

In light of this, a control device having a digital interface and a transceiver unit are presented. Exemplary embodiments are described in the following description.

The control device presented is thus designed for two different operating modes that can be set selectably.

Also presented herein is a control device that is designed exclusively for the first mode described hereinafter. In this first mode, the transfer of data, e.g., of PSI5 data, occurs via an SPI interface or an ASC interface.

Further advantages and exemplary embodiments of the present invention are described in the following with reference to the accompanying drawings.

It is understood that the features recited above and those yet to be explained below are usable not only in the respective combination indicated, but also in other combinations or in isolation, without departing from the scope of the present invention.

DETAILED DESCRIPTION

Figure 1:
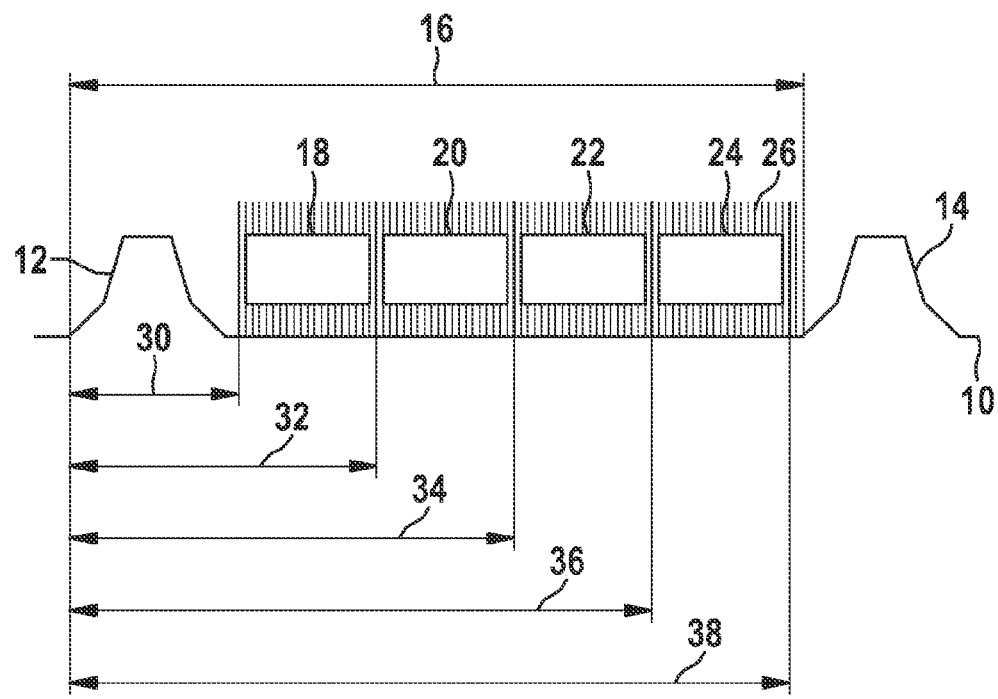
FIG. 1 shows the principle of the definition of time windows.

FIG. 1 shows the principle of time window definition or slot definition. The depiction shows the profile of a signal 10 having a first synchronization (sync) pulse 12 and a second synchronization pulse 14. The time period between the two pulses 12 and 14 is indicated with a double arrow 16 and labeled Tsync.

The depiction further shows a first data frame 18, a second data frame 20, a third data frame 22, and a fourth data frame 24. Below data frames 18 to 24 is a 1-µs grid 26. The grid is configurable. The interaction of the system components, Manchester decoder, and slot definition moreover enables detailed error management in terms of the frames, e.g., "frame not received," "frame not in defined slot or time slot," etc.

A first arrow 30 shows the time span until the first time window, a second arrow 32 the time span until the end of the first time window and the beginning of the second time window, a third arrow 34 the time span until the end of the second time window and the beginning of the third time window, a fourth arrow 36 the time span until the end of the third time window and the beginning of the fourth time window, and a fifth arrow 38 the time span until the end of the fourth time window and the beginning of the fifth time window.

In the exemplary embodiment depicted, four time windows each having a respective data frame 18, 20, 22, 24 are therefore located between the two synchronization pulses 12 and 14. In an exemplary embodiment, up to six time windows can be provided.

Figure 2:
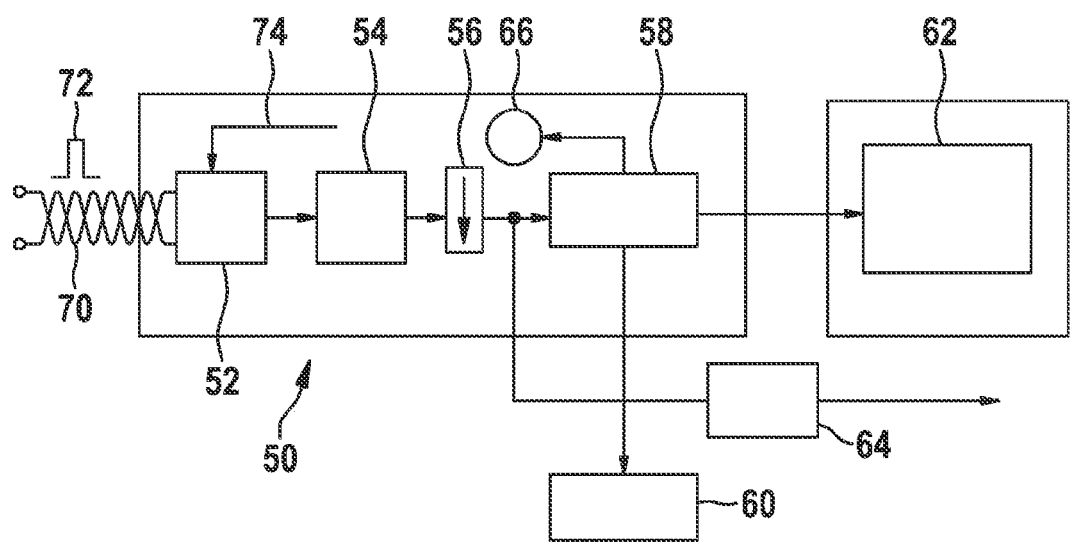
FIG. 2 is a schematic circuit diagram showing a transceiver unit.

FIG. 2 is a schematic circuit diagram depicting a transceiver, in this case a PSI5 transceiver, labeled in its entirety with the reference number 50. This transceiver 50 encompasses an A/D converter 52, an adaptive filter 54, a unit 56 for decimation, and a Manchester decoder 58. Manchester decoder 58 is connected to an error register 60. Also provided is a PSI5 receiving register 62 that is connected to the output of Manchester decoder 58. A comparator 64 is provided for the non-ASC/SPI option. A synchronization 66 of Manchester decoder 58 occurs upon the edge transition of the start bit. A signal 72 is transmitted from a sensor via a two-wire lead 70 of a bus system (not depicted) and is processed in A/D converter 52 using a working clock 74.

Optimization of A/D converter 52 is useful only by way of verification with hardware. The order of adaptive filter 54 is determined by the settling time of the pulse response of the bus system.

Figure 3:
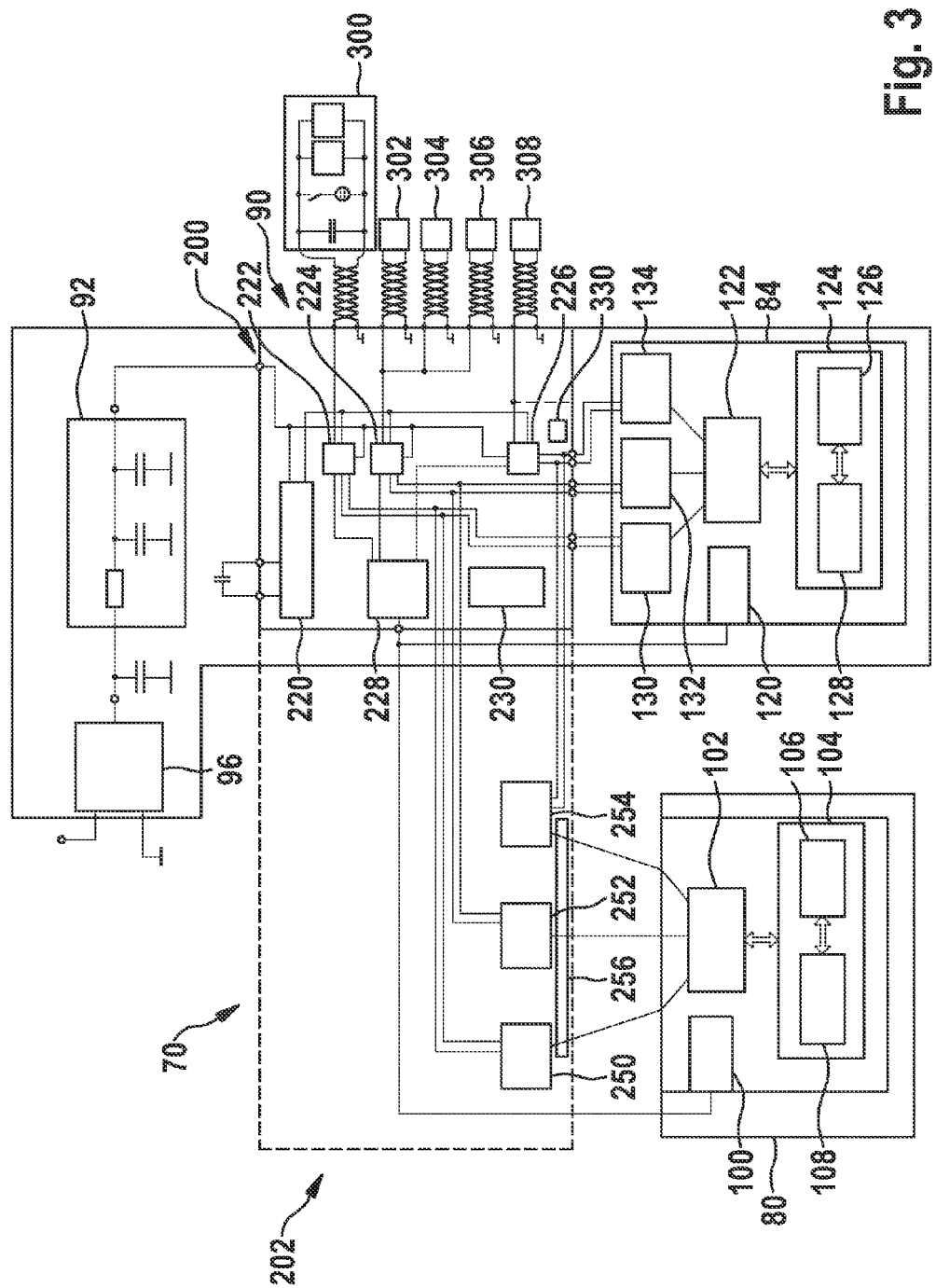
FIG. 3 is a block diagram showing the different modes of the digital interface that is presented.

FIG. 3 depicts in highly simplified fashion, in a block diagram, exemplary embodiments of the control device presented, which is labeled in its entirety with the reference number 70.

The depiction shows a first microcontroller 80 according to a first mode and a second microcontroller 84 according to a second mode. Also depicted are a transceiver unit 90, in this case for a PSI5 interface, a PI filter 92 for the interface, and a voltage regulator 96.

Depicted in first microcontroller 80 are an ADC 100, a block for direct memory access (DMA) 102, and a core 104 having a computer core 106 and a RAM module 108. Likewise depicted in second microcontroller 84 are an ADC 120, a block for direct memory access (DMA) 122, and a core 124 having a computer core 126 and a RAM module 128. A first interface controller 130, a second interface controller 132, and a third interface controller 134 are also provided. First microcontroller 80 is provided for the first mode, and second microcontroller 84 for the second mode.

For illustration, transceiver unit 90 is depicted with a first segment 200 that is bordered by a solid line, and a second segment 202 that is bordered by a dashed line. Provided in first segment 200 is a bootstrap circuit 220, a first transceiver 222, a second transceiver 224, and a third transceiver 226, as well as a multiplexer 228 and a synchronous pulse timer 230.

Further provided in second segment 202 are a first interface controller 250, a second interface controller 252, and a third interface controller 254, as well as an SPI/ASC interface 256.

The number of transceivers 222, 224, 226 indicated in this exemplary embodiment is only by way of example; the number of transceivers 222, 224, 226 can vary.

In the first mode, first microcontroller 80 now interacts with transceiver unit 90, which requires for that purpose the components of first segment 200 and of second segment 202. In the second mode, second microcontroller 84 interacts with transceiver unit 90, which requires for that purpose only the components of first segment 200. This is because in the second mode, interface controllers 130, 132, 134 that are provided in second microcontroller 84 are used.

An exemplary embodiment in which first microcontroller 80 and second microcontroller 84, as well as two independent or mutually separated transceiver units are provided on control device 70, of which the first encompasses both segments 200 and 202 and the second transceiver unit encompasses only the first segment, is conceivable. It is noteworthy that control device 70 presented here can execute both modes. Transceiver unit 90, or optionally multiple transceiver units, are typically each implemented in an ASIC. It is of course also possible to implement first segment 200 and second segment 202 separately, each in one ASIC.

In principle, it is also possible to provide only one microcontroller 80, 84, in this case second microcontroller 84, in which in the first mode the internally present interface controllers 130, 132, 134 are not utilized, but instead interface controllers 250, 252, 254 in transceiver unit 90.

Also shown are a first sensor 300, a second sensor 302, a third sensor 304, a fourth sensor 306, and a fifth sensor 308, which are read out by control device 70.

Control device 70 presented here supports two different operating modes. In the first mode, the transfer of PSI5 data occurs via SPI and ASC interface 256. In the second mode, interface controllers 130, 132, 134 are integrated into second microcontroller 84. An advantage of this control device 70 is that both modes are covered. The description below will be confined to the first mode.

The system referred to as the first mode is made up of the following analog blocks:
- external voltage regulator 96,
- PSI5 ASIC or transceiver unit 90,
- bootstrap circuit 220 for synchronous pulse generation,
- charge pump 330,
- multiplexer (MUX) 228 output for PSI5 pin diagnostics,
- voltage supply block for digital core of the ASICs, and the digital blocks:
- ASC or SPI interface 256 via data transfer and diagnostics,
- RAM register with time stamp and diagnostics,
- PSI5 Manchester decoder and data evaluation (CRC calculation),
- timer and time stamp generator,
- configuration and diagnostics register,
- upstream data RAM,
- synchronous pulse timer 230.

The electronic module presented here represents an economical hardware solution for control devices, in particular for engine control devices. In at least some of the exemplary embodiments, the module has considerable advantages. For example, the number of bootstrap circuits in the module, for example an ASIC (application-specific module) can be reduced thanks to the staggering of synchronous pulses for two, three, or more transceivers. Automated upstream frame generation is also possible. A watchdog timer for PSI5 frames can be implemented.

Because adapting filtering for PSI5 input data can be accomplished, a bus terminator is not necessary. An improvement in signal quality is moreover achieved, which in turn leads to a reduction in the number of unrecognized bit errors. The Vsync voltage is generated using a circuit (so-called "bootstrap" circuit 220) integrated into transceiver unit 90. Compatibility exists with both data stream ranges, namely 22 mA to 30 mA and 11 mA to 15 mA.

The ASIC implementation presented herein represents a backward-compatible solution for acquiring PSI5 sensor data and for bidirectional communication with PSI5 sensors for transceiver solutions that are already available. The transceiver solution presented here can be used in many ways. A variety of interfaces can be implemented in the ASIC:
- ASC,
- SPI,
- parallel interface.

Switchover occurs here via configuration registers. One possible advantage of control device 70 is the interaction of the synchronous pulse timer block with bootstrap circuit 220.

Using synchronous pulse timer block 230, time-discrete continuous synchronous pulses can be generated automatically for the available PSI5 transceivers 222, 224, 226. The time reference among the synchronous pulses can be freely programmed, so that multiple synchronous pulses of different PSI5 transceivers of an ASIC are never requested simultaneously, and the spacing between two synchronous pulses is always larger as compared with a specific defined time difference.

This "staggering" of synchronous pulses, interacting with bootstrap circuit 220 that is responsible for the actual synchronous voltage generation, makes it possible to generate synchronous pulses for multiple PSI5 transceivers using only one bootstrap circuit 220.

Synchronous pulse timer block 230 also allows event-triggered synchronous pulses to be embodied and generated. Time synchronicity with software time slices can be guaranteed by clocking the clock signal of the ASIC synchronously with the software time slice in the microcontroller.

The upstream RAM module handles conditioning of the data that are transferred from the control device to the sensors. The following items are carried out automatically, and reduce software run time and thus software resources:
- CRC calculation,
- start bits, CRC bits, and stuff bits are automatically integrated into the frame,
- buffering of upstream frame,
- verification capabilities for PSI5 frame that is generated.

A watchdog timer monitors the received frames in terms of:
- time windows,
- configured frame width.

This timer is defined for each transceiver and each frame. The function ensures that the data transfer of each frame is monitored in terms of the items recited above. The frame width can simultaneously be monitored absolutely with respect to the synchronous pulse, and relative to the previous and subsequent frame.

An adaptive filter (also "adaptive rectifier") is used in many telecommunication sectors. Because the PSI5 bus system has no bus terminator, different signal distortions occur depending on the bus topology being used. The transceiver receivers are thus specifically configured as a function of the bus topology.

Provision is now made that the PSI5 transceiver receiver is preceded by an adaptive filter, in this case filter 92. This filter 92 has the property that it automatically adapts to the bus topology.

As a result, bus topology-specific configuration is also no longer necessary. Thanks to the use of a digital interface, the learned adaptive filter parameters can furthermore be stored in the computer core of a control device, and downloaded back into the transceiver upon another start or restart. This yields advantages in terms of the training time of the adaptive filter. Sensor data are thus available more quickly after a control device 70 is switched on.

It is possible for sensors to be awakened and deactivated in targeted fashion using downstream data. The power consumption of the PSI5 bus system can thereby be reduced. The transceiver supports this mode. The ASIC correspondingly incorporates compensation for the DC current level in the context of PSI5 data evaluation.

What is claimed is:

1. A control device, comprising:
   at least one microcontroller;
   a digital interface, the digital interface including a transceiver unit and at least one interface controller,
   wherein:
   the control device is adapted selectably for a first mode in which the at least one interface controller communicates via an interface with the at least one microcontroller, or for a second mode in which the at least one interface controller is integrated into the at least one microcontroller;
   the transceiver unit includes a plurality of transceivers and a bootstrap circuit; and
   the bootstrap circuit generates synchronization pulses for the transceivers in a staggered fashion such that the transceivers receive respective synchronization pulses at different times.

2. The control device according to claim 1, wherein a first microcontroller is adapted for the first mode and a second microcontroller is adapted for the second mode.

3. The control device according to claim 1, wherein the digital interface is a PSI5 interface.

4. The control device according to claim 1, wherein the control device is implemented in an application-specific module (ASIC).

5. The control device according to claim 1, further comprising a voltage regulator.

6. The control device according to claim 1, further comprising a charge pump.

7. A transceiver unit for a digital interface for a control device, the control device comprising at least one microcontroller and the digital interface, the digital interface including the transceiver unit and at least one interface controller, wherein the control device is adapted selectably for a first mode in which the at least one interface controller communicates via an interface with the at least one microcontroller, or for a second mode in which the at least one interface controller is integrated into the at least one microcontroller, the transceiver unit comprising:
   a plurality of transceivers; and
   a bootstrap circuit, wherein the bootstrap circuit is configured to generate synchronization pulses in a staggered fashion such that the transceivers receive respective synchronization pulses at different times.

8. The transceiver unit according to claim 7, wherein the at least one interface controller is integrated into the transceiver unit.

9. The transceiver unit according to claim 7, wherein the transceiver unit is adapted for communication with the at least one interface controller that is integrated into the at least one microcontroller.

* * * * *